(12) United States Patent
Shimomura et al.

(10) Patent No.: US 8,616,322 B2
(45) Date of Patent: Dec. 31, 2013

(54) HYBRID WORKING MACHINE

(75) Inventors: Keisuke Shimomura, Hiroshima (JP);
Koichi Nishimura, Hiroshima (JP);
Shinji Katsuhara, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 379 days.

(21) Appl. No.: 12/782,952

(22) Filed: May 19, 2010

(65) Prior Publication Data

US 2010/0294577 A1 Nov. 25, 2010

(30) Foreign Application Priority Data

May 25, 2009 (JP) ................................. 2009-125360

(51) Int. Cl.
*B60K 1/00* (2006.01)

(52) U.S. Cl.
USPC .......................................... 180/291; 180/68.1

(58) Field of Classification Search
USPC .......... 180/291, 65.31, 68.1, 68.2, 68.4, 68.6, 180/903, 907, 952
See application file for complete search history.

(56) References Cited

U.S. PATENT DOCUMENTS

| 6,789,335 | B1 * | 9/2004 | Kinugawa et al. | 37/348 |
| 8,100,210 | B2 * | 1/2012 | Takeuchi et al. | 180/68.5 |
| 2005/0001606 | A1 * | 1/2005 | Kagoshima | 323/371 |
| 2009/0199553 | A1 * | 8/2009 | Nishimura et al. | 60/486 |

FOREIGN PATENT DOCUMENTS

| JP | 2004-169466 | 6/2004 |
| JP | 3649147 | 2/2005 |
| JP | 2005-247147 | 9/2005 |
| JP | 2007-016413 | 1/2007 |
| JP | 2007-107230 | 4/2007 |
| JP | 2008-014087 | 1/2008 |
| JP | 2008-127762 | 6/2008 |

OTHER PUBLICATIONS

U.S. Appl. No. 12/782,970, filed May 19, 2010, Shimomura, et al.
U.S. Appl. No. 12/782,977, filed May 19, 2010, Shimomura, et al.
Japanese Office Action issued Nov. 20, 2012 in Japanese Patent Application No. 2009-125360 w/English translation.

* cited by examiner

*Primary Examiner* — Jeffrey J Restifo
*Assistant Examiner* — Erez Gurari
(74) *Attorney, Agent, or Firm* — Oblon, Spivak, McClelland, Maier & Neustadt, L.L.P.

(57) ABSTRACT

Since a stand including a plurality of supports and a top plate is built in on one side of a rear part of an upper frame of an upper rotating body as seen from an operator in a cabin, and a power storage device is installed on the top plate of this stand, the power storage device is arranged at the highest position among all the devices mounted in the upper rotating body. The power storage device is made up of a main body and a casing, and cooled down by taking cooling air into the casing.

7 Claims, 8 Drawing Sheets

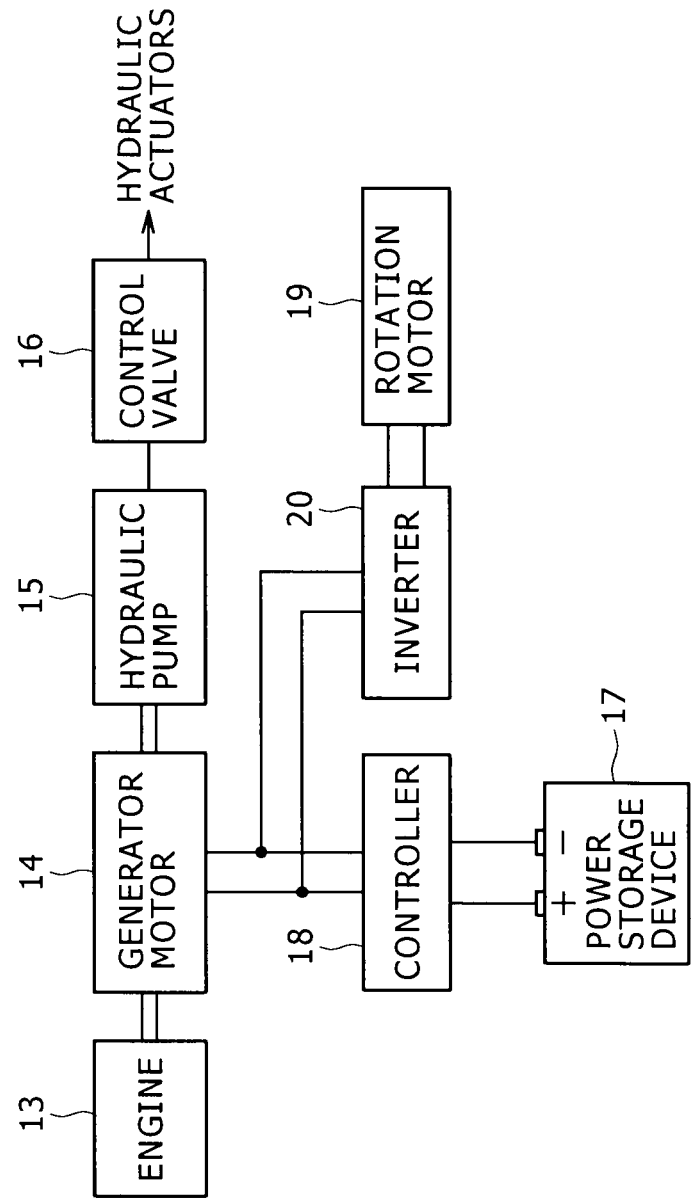

HYBRID WORKING MACHINE

BACKGROUND OF THE INVENTION

1. Field of the Invention

The present invention relates to a hybrid working machine for which engine power and electric power are used in combination.

2. Description of the Related Art

As shown in FIG. 8, in the excavator, an upper rotating body 2 is mounted on a crawler type lower traveling body 1 rotatably around a vertical axis which is vertical to the ground. A working attachment 9 including a boom 3, an arm 4, a bucket 5 and including a boom cylinder 6, an arm cylinder 7 and a bucket cylinder 8 for, respectively, actuating the boom, the arm and the bucket is attached to a front part of this upper rotating body 2.

A cabin 10 is mounted on the left side of the front part of the upper rotating body 2, and a counterweight 11 is equipped on a rear end of the upper rotating body.

An engine room 12 is provided on a rear part of the upper rotating body 2, and an engine 13 serving as a power source is installed in this engine room 12 (refer to Japanese Patent No. 3649147 (hereinafter, referred to as Patent Document 1)).

It should be noted that in the present specification, expressions "front and rear" and "left and right" indicate the directions seen from an operator who sits in the cabin 10.

FIG. 9 shows a block configuration of a drive system and a control system in a case of a hybrid type excavator.

A generator motor 14 for performing a generator operation and a motor operation and a hydraulic pump 15 are connected to the engine 13, and driven by the engine 13.

Discharge oil from the hydraulic pump 15 is supplied to hydraulic actuators such as the boom cylinder 6, the arm cylinder 7 and the bucket cylinder 8 shown in FIG. 8 and a left and right traveling hydraulic motor (not shown) through a control valve (which is the collective of plural valves each of which is provided for each of the actuators respectively) 16, so that the hydraulic actuators are driven.

Meanwhile, a power storage device (a power battery) 17 made up of a secondary battery or the like is connected to the generator motor 14 through a controller 18, and a rotation motor 19 serving as a rotation driving source is connected to the generator motor 14 through an inverter 20.

The controller 18 controls charging and discharging operations and the like of the power storage device 17 in accordance with excess and deficiency of generator output of the generator motor 14.

The inverter 20 switches the generator motor 14 between the generator operation and the motor operation, and controls generated power or an electric current as the motor or torque.

Conventionally, hybrid devices mounted in such a hybrid type excavator are installed in the engine room 12 or the like as shown in Japanese Patent Laid-Open No. 2007-107230 (hereinafter, referred to as Patent Document 2).

Here, there is a need for cooling down the power storage device 17 which generates heat themselves and is sensitive to heat among the hybrid devices, in order to ensure the original performance and the life. In this case, as cooling means, an air cooling method is the most advantageous in terms of cost, space and the like.

In the known techniques shown in Patent Documents 1 and 2, the power storage device 17 is arranged side by side with the other hybrid devices and the hydraulic pump 15 and the control valve 16 serving as hydraulic devices on the same plane.

However, in the hybrid working machine, since the hybrid devices are added to limited space of the existing machine, installation space for the devices is restricted.

Therefore, in the known techniques with arrangement on the same plane, a lot of devices including the power storage device 17 are concentrated on narrow space.

And sufficient space for a passage of the cooling air cannot be consequently obtained around the power storage device 17 when adopting the air cooling method. Thus, flow of the cooling air to the power storage device 17 is deteriorated so that cooling efficiency is decreased. There is a problem that the performance and the life of the power storage device 17 are lowered.

SUMMARY OF THE INVENTION

The present invention is to provide a hybrid working machine capable of efficiently cooling down a power storage device by an air cooling method.

The present invention is a hybrid working machine, including an upper rotating body provided with a working attachment and rotatably mounted on a lower traveling body, a cabin installed on one side of a front part of the upper rotating body where the working attachment is provided, and a power storage device serving as a power source for a generator motor for performing a generator operation and a motor operation, in which the power storage device is installed on the other side of a rear part of an upper frame of the upper rotating body as seen from an operator in the cabin in a state that the power storage device is placed at the highest position among all the devices mounted on the upper rotating body.

According to the present invention, the power storage device is provided at the highest position among all the devices mounted in the upper rotating body, that is, at the best ventilated position with the least obstacles in a circumference thereof. Therefore, it is possible to facilitate contact with the cooling air so as to effectively cool down the power storage device.

Since there are no obstacles against sufficient maintenance in the circumference, maintenance including replacement of the power storage device is easily performed.

Moreover, the power storage device is installed on the other side of the rear part as seen from the operator in the cabin which is a position out of visibility required at the time of operation. Therefore, even when the power storage device is placed at a high position, there is a little fear that the power storage device deteriorates working visibility.

BRIEF DESCRIPTION OF THE DRAWINGS

FIG. 9 is a block configuration diagram of a drive system and a control system in a case of a hybrid excavator.

DESCRIPTION OF THE PREFERRED EMBODIMENTS

An embodiment of the present invention will be described with FIGS. 1 to 7.

Figure 8:
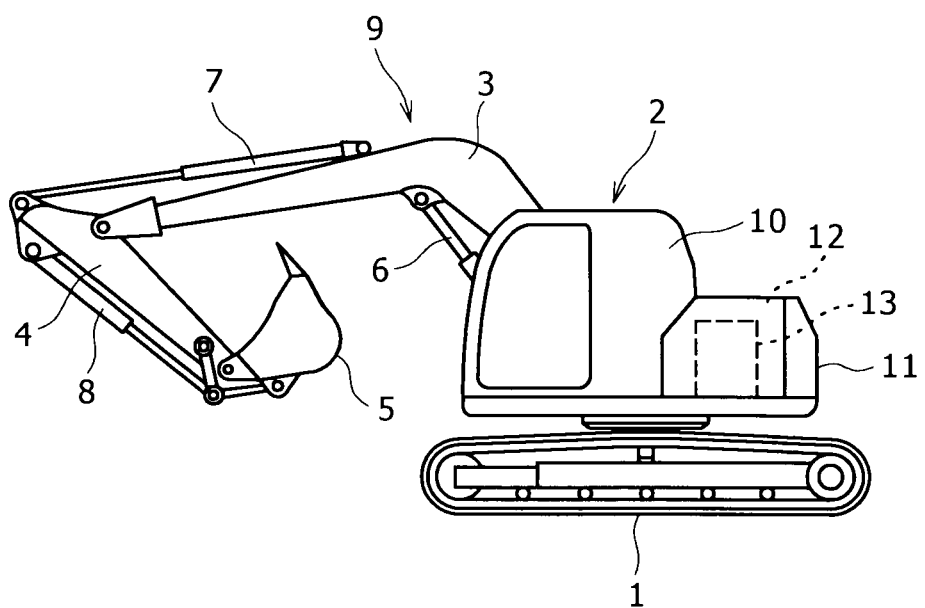
FIG. 8 is a schematic side view of an excavator to which the present invention is applied as an example.

In the embodiment, the present invention is applied to a hybrid excavator shown in FIGS. 8 and 9.

It should be noted that in the embodiment, among the members and devices to be equipped or mounted in the hybrid excavator, the same ones as in FIGS. 8 and 9 are given the same reference numerals.

Figure 1:
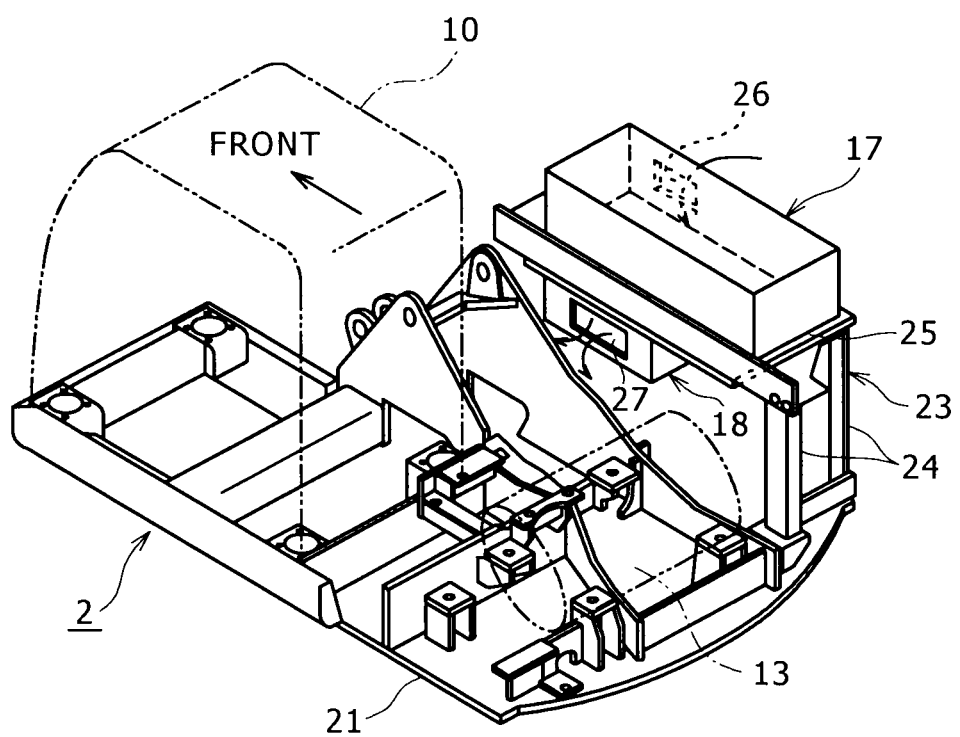
FIG. 1 is a perspective view of an upper frame of an upper rotating body in a hybrid excavator in an embodiment of the present invention.
Figure 2:
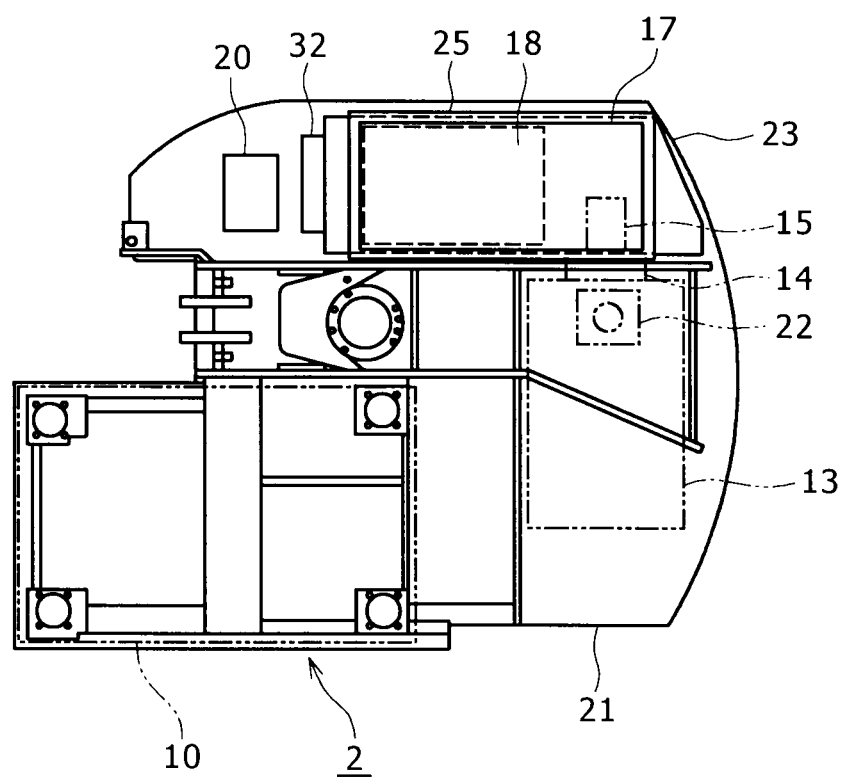
FIG. 2 is a side view of the upper frame.
Figure 3:
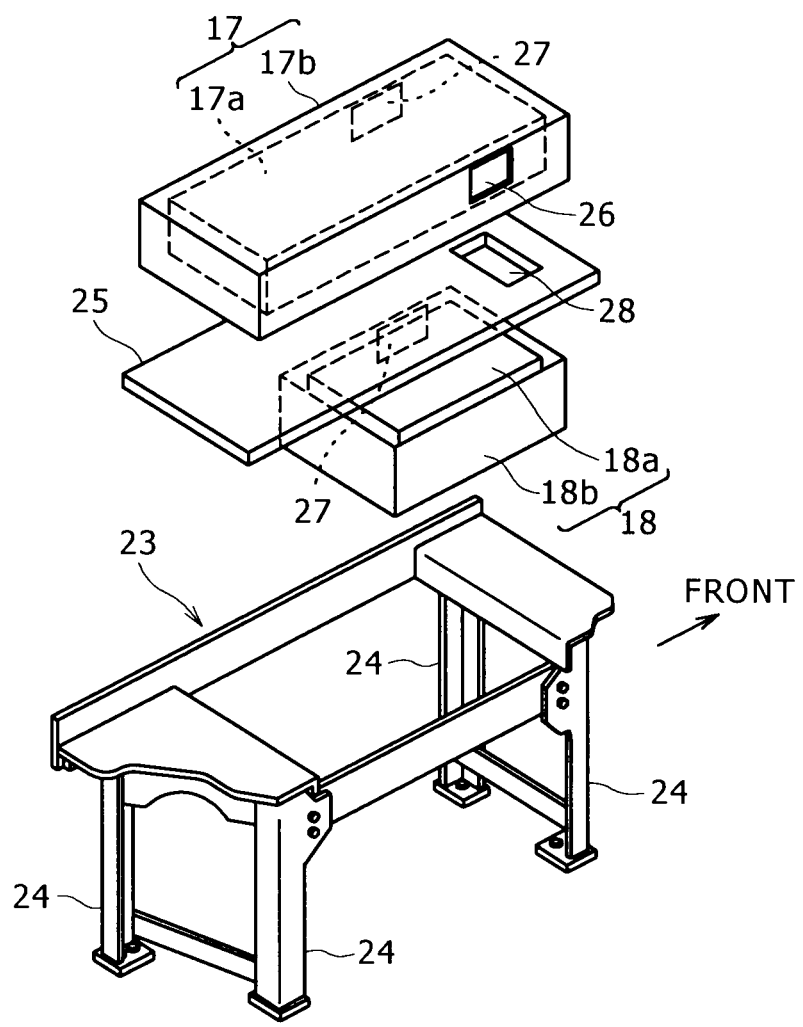
FIG. 3 is an exploded perspective view of a stand provided on the upper frame, and a power storage device and a controller to be built into the stand.
Figure 4:
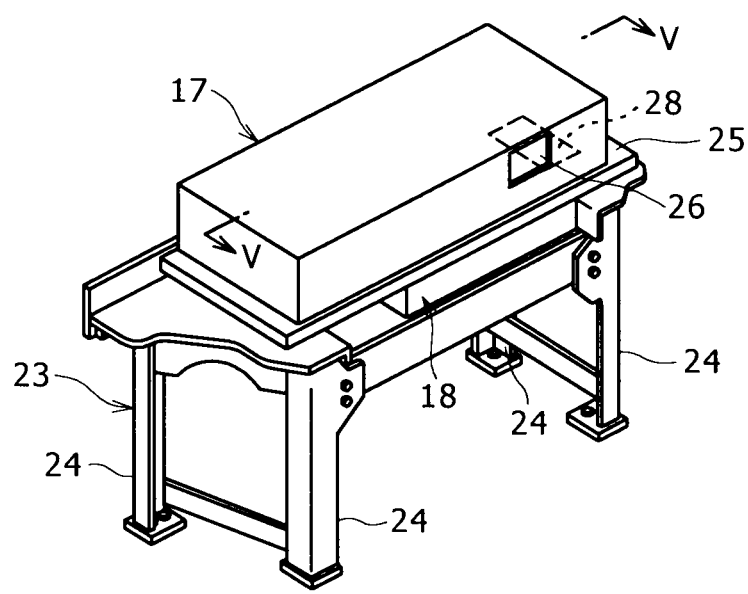
FIG. 4 is a perspective view of a state that the power storage device and the controller are built into the stand.

In FIGS. 1, 2, the reference numeral 21 denotes an upper frame constituting an upper rotating body 2. A working attachment 9 in FIG. 8 is equipped on a substantial center of a front part of this upper frame 21. A cabin 10 is mounted on the left side of the front part, which is one side of the front part, of the upper frame 21. An engine 13 is mounted on a rear part of the upper frame 21. A generator motor 14 and a hydraulic pump 15 are connected to the engine 13. In FIG. 2, the reference numeral 22 denotes a muffler of the engine 13.

A stand 23 is attached to the rear part of the upper frame 21 on a right side deck (on the diagonally rearward right seen from an operator in the cabin 10). A plurality of devices including hybrid devices such as a power storage device 17 is built into this stand 23. It should be noted that positional relationships between the devices and the like are expressed as seen from an operator in the cabin 10. Hereinafter, the "one side" indicates the "left side" and the "other side" indicates the "right side".

This point will be described in detail.

As shown in FIGS. 3 to 6 in detail, the stand 23 serves as a self-standing and assembling type of independent stand which is formed by combining four front, rear, left and right supports 24 (the supports may be five or more) with plural beam members by means of bolts and attaching a top plate 25 between upper ends of the supports 24.

Figure 5:
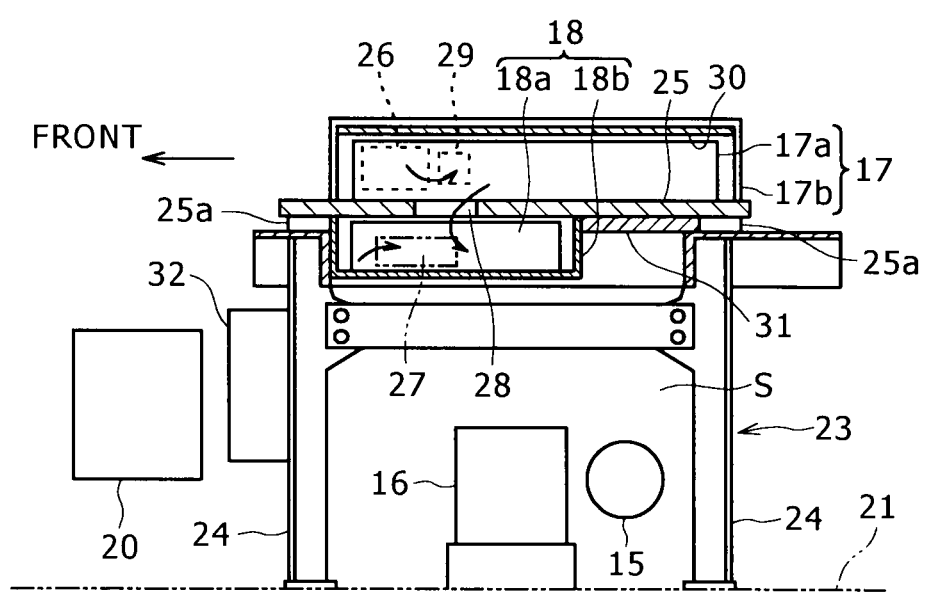
FIG. 5 is a sectional view taken from line V-V of FIG. 4.
Figure 6:
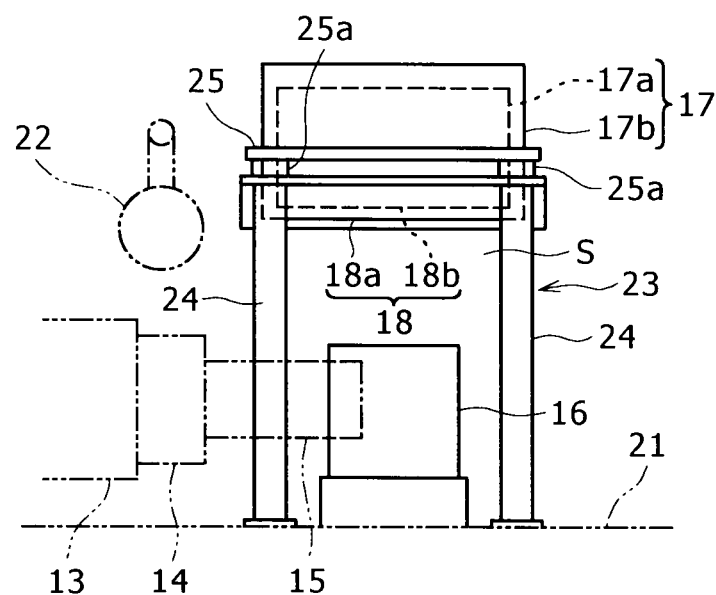
FIG. 6 is a back view of FIG. 4.

This stand 23 is attached to the upper frame 21 detachably at lower ends of the supports 24 in a state that the hydraulic pump 15 and a control valve 16 are accommodated in space S below the top plate 25 (the stand 23 is over the both devices 15, 16) as shown in FIGS. 5, 6. The power storage device 17 is installed on the upper surface side of the top plate 25, and the controller 18 is installed on the lower surface side.

That is, the power storage device 17 and the controller 18 are arranged so as to overlap each other in the up and down direction in a state that the top plate 25 is placed between the power storage device and the controller. And the power storage device 17 on the upper side is arranged at the highest position among all the devices arranged on the upper rotating body 2.

The power storage device 17 and the controller 18 are each made up of a main body 17a or 18a and casing 17b or 18b covering the main body, and attached to the top plate 25 so that the main bodies face each other relative to the top plate 25.

It should be noted that the casing 17b of the power storage device is formed into a box with an open lower surface, and the casing 18b of the controller is formed into a box with an open upper surface. The casing 17b of the power storage device is installed on the top plate 25 through vibration-proof mounts 25a (refer to FIGS. 5, 6).

An intake port 26 is provided on a right side surface of the casing 17b of the power storage device 17, and an exhaust port 27 is provided on a left side surface of the casing 18b of the controller 18. A ventilation port 28 (which is an exhaust port of cooling air from the power storage device 17) providing communication between the casings 17b, 18b is provided at a position on the top plate 25 where the both devices overlap each other.

It should be noted that wire sheets or filters for preventing invasion of foreign substances are provided in the intake port 26 and the exhaust port 27 although not shown in the figures.

A suction fan 29 is provided in the casing 17b of the power storage device 17.

According to this structure, the external air (the cooling air) is introduced into the power storage device 17 (the casing 17b) by the suction fan 29, fed through between the main body 17a of the power storage device and the casing 17b, and fed into the controller 18 (the casing 18b) from the ventilation port 28 as shown by arrows in FIGS. 1, 5.

Then, the external air is fed through between the main body 18a of the controller and the casing 18b as similarly as the power storage device 17, and exhausted from the exhaust port 27 to the exterior.

It should be noted that although not shown in the figure, a guard member also serving as a heat shield plate is normally provided on a surface of the stand 23 on the side where the exhaust port 27 opens (a left side surface of the stand 23) so as to cover the exhaust port 27. Therefore, an opening for releasing the air exhausted from the exhaust port 27 is provided in this guard member also serving as the heat shield plate.

Meanwhile, when the power storage device 17 is arranged at the highest position, the power storage device receives direct solar heat. Therefore, there is a fear that a cooling effect is decreased.

Then, as means for protecting the main body 17a of the power storage device against the solar heat, as shown in FIG. 5, a heat insulating member 30 as a heat insulating layer for blocking solar heat is provided on the inner side of an upper surface of the casing 17b.

A heat insulating member 31 for blocking heat from the hydraulic pump 15 and the control valve 16 serving as heat-generating hydraulic devices is also provided on a lower surface of the top plate.

Further, heat shield plates (not shown) are attached to front, rear left and right side surfaces (between the supports) of the stand 23 so as to surround the space S for the hydraulic devices.

These heat shield plates prevent situations that the heat from the hydraulic devices (the hydraulic pump 15, the control valve 16) is transferred through the outer peripheral side of the stand to the power storage device 17 on the top plate 25 or radiated onto electric devices installed around the stand 23 other than the power storage device 17 (such as an inverter 20 installed on the front side of the stand as described later), and that the heat of the engine room including the heat from the muffler 22 invades the space S of the stand 23.

A converter 32 for normally controlling the battery is attached to the front surface of the stand 23, and the inverter 20 is installed in front of the stand on the upper frame 21 through another stand (not shown).

As described above, the power storage device 17 is provided at the highest position among all the devices mounted in the upper rotating body 2, that is, at the best ventilated position with the least obstacles in a circumference thereof. Therefore, it is possible to facilitate contact with the cooling air so as to effectively cool down the power storage device 17.

There are no obstacles to maintenance in the circumference, so that sufficient maintenance space can be ensured. Therefore, the maintenance for the power storage device 17 is easily performed.

Further, the power storage device is installed on the right side of the rear part as seen from the operator in the cabin 10 which is a position out of visibility required at the time of operation. Therefore, even when the power storage device 17 is placed at a high position, there is a little fear that the power storage device deteriorates working visibility.

In addition, the following effects can be obtained according to the embodiment.

(i) The cooling air is introduced into the casing 17b of the power storage device 17 and brought into direct contact with the main body 17a of the power storage device, and the suction fan 29 offers forcible air intake and exhaust. Therefore, it is possible to more efficiently cool down the main body 17a.

(ii) By the heat insulating member 30 (the heat insulating layer) provided on the inner side of the upper surface of the casing 17b of the power storage device, it is possible to protect the main body 17a of the power storage device against solar heat so as to increase the cooling effect of the main body 17a of the power storage device.

(iii) By utilizing the space below the power storage device 17 (the top plate 25 of the stand) and the supports 24 of the stand, it is possible to compactly build in the other devices (the controller 18, the converter 32, the hydraulic pump 15, the control valve 16) in a state that cooling performance and a maintenance property of the power storage device 17 are not deteriorated.

Consequently utilization efficiency for space can be increased. Therefore, device layout is easily determined. Alternatively, device occupancy space can be reduced so as to decrease a rotation radius of a rear end of the machine.

(iv) The controller 18 for controlling the power storage device installed on the lower side of the top plate 25 of the stand is cooled down by a cooling structure which is common to the power storage device 17. Therefore, the present invention is advantageous in terms of cost and space.

(v) Since the power storage device 17 and the controller 18 which are often inspected at the same time are arranged in the up and down direction, it is possible to arrange the both devices 17, 18 close to each other within limited space. Therefore, the maintenance is more easily performed.

(vi) It is possible to utilize the ventilation port 28 as a distribution hole for a wire connecting the both devices 17, 18. Therefore, wiring is easily performed with the shortest length.

Figure 7:
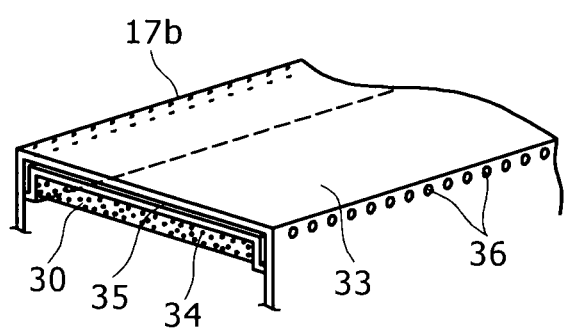
FIG. 7 is a partially perspective view showing another embodiment related to a heat insulating structure of the power storage device.

Other Embodiments (1) FIG. 7 shows another embodiment related to a heat insulating layer for protecting the main body 17a of the power storage device against the solar heat.

In this embodiment, the upper surface of the casing 17b of the power storage device is formed into a double wall structure including outer and inner plates 33, 34 so as to form an air layer 35 serving as the heat insulating layer.

A large number of escape holes 36 for releasing the heat enclosed in the air layer 35 to the exterior of the casing are provided in an upper part of a peripheral surface of the casing corresponding to this air layer 35.

In such a way, it is possible to enhance a heat insulating effect against the solar heat so as to more increase the cooling effect of the power storage device 17.

In this embodiment, the heat insulating member 30 may be provided on the lower side of the air layer 35 as shown in the figure, or the heat insulating member is not necessarily provided. Alternatively, the air layer 35 may be filled with a heat insulating member.

(2) The suction fan 29 may be provided in the vicinity of the ventilation port 28 or the exhaust port 27 of the casing 18b of the controller.

Alternatively, a push-in fan may be used instead of the suction fan 29. Further, such a fan is not necessarily provided, so that the air is suctioned and exhausted by a natural convection current. It this case, there is a possibility that the intake port 26 in the above embodiment functions as an exhaust port and the exhaust port 27 functions as an intake port according to circumstances.

(3) Separate cooling structures for the power storage device 17 and the controller 18 may be provided respectively for independently cooling down the both devices.

In this case, the exhaust port of the power storage device 17 is provided in the casing 17b (a side surface or the like) of the power storage device.

(4) In the above embodiment, the controller 18 is installed on the lower side of the top plate 25 of the stand. However, this controller 18 may be provided at a different position or at a position away from the power storage device 17.

(5) In the above embodiment, the power storage device 17 is installed on the top plate 25 of the stand 23 which is assembled independently from the upper frame 21. However, a shelf shape support plate may be fixed to the rear part of the upper frame 21 on the right side through a bracket and the power storage device 17 may be installed on this support plate (at the highest position among all the devices).

Although the invention has been described with reference to the preferred embodiments in the attached figures, it is noted that equivalents may be employed and substitutions made herein without departing from the scope of the invention as recited in the claims.

What is claimed is:

1. A hybrid working machine, comprising:
a lower traveling body;
an upper rotating body rotatably mounted on said lower traveling body;
a working attachment provided on said upper rotating body;
a cabin installed on one side of a front part of said upper rotating body where said working attachment is provided; and
a power storage device serving as a power source for a generator motor mounted on said upper rotating body for performing a generator operation and a motor operation, said power storage device being installed on the other side of a rear part of an upper frame of said upper rotating body as seen from an operator in said cabin, wherein said power storage device is placed in a state that a lower surface of said power storage device is higher than any of an upper surface of an engine, an upper surface of the generator motor, an upper surface of a hydraulic pump, and an upper surface of a control valve, mounted on said upper rotating body.

2. The hybrid working machine according to claim 1, wherein
said power storage device is formed by accommodating a main body of said power storage device in a casing of said power storage device, and
cooling air is introduced into said casing, brought into direct contact with said main body of said power storage device, and exhausted to the exterior of said casing after cooling.

3. The hybrid working machine according to claim 2, wherein a heat insulating layer for protecting said main body of said power storage device against solar heat is provided on the inner side of an upper surface of said casing of said power storage device.

4. The hybrid working machine according to claim 3, wherein
   as said heat insulating layer, the upper surface of said casing is formed into a double wall structure including outer and inner plates so as to form an air layer, and
   an escape hole for releasing heat in said air layer to the exterior of said casing is provided on a peripheral surface of said casing.

5. The hybrid working machine according to claim 1, wherein
   said upper rotating body includes a stand including a plurality of supports and a top plate extended over upper ends of said supports so as to form a space under said top plate, and
   said power storage device is installed on said top plate of said stand.

6. A hybrid working machine, comprising:
   a lower traveling body;
   an upper rotating body rotatably mounted on said lower traveling body;
   a working attachment provided on said upper rotating body;
   a cabin installed on one side of a front part of said upper rotating body where said working attachment is provided; and
   a power storage device serving as a power source for a generator motor mounted on said upper rotating body for performing a generator operation and a motor operation, said power storage device being installed on the other side of a rear part of an upper frame of said upper rotating body as seen from an operator in said cabin, wherein said power storage device is placed in a state that a lower surface of said power storage device is higher than any of a lower surface of an engine, a lower surface of the generator motor, a lower surface of a hydraulic pump, and a lower surface of a control valve, mounted on said upper rotating body, and an upper surface of said power storage device is higher than any of an upper surface of the engine, an upper surface of the generator motor, an upper surface of the hydraulic pump, and an upper surface of the control valve, mounted on said upper rotating body, wherein
   said upper rotating body includes a stand including a plurality of supports and a top plate extended over upper ends of said supports so as to form a space under said top plate, and
   said power storage device is installed on said top plate of said stand.

7. The hybrid working machine according to claim 6, wherein at least one of said engine, said generator motor, said hydraulic pump and said control valve are provided in said space.

* * * * *